United States Patent [19]

Turner et al.

[11] Patent Number: 4,894,072
[45] Date of Patent: Jan. 16, 1990

[54] HIGH EFFICIENCY VAPOR STORAGE CANISTER

[75] Inventors: Kenneth W. Turner, Webster; Charles H. Covert, Manchester; Patti S. DuBois, Hamlin, all of N.Y.

[73] Assignee: General Motors Corporation, Detroit, Mich.

[21] Appl. No.: 328,916

[22] Filed: Mar. 27, 1989

[51] Int. Cl.$^4$ ............................................. B01D 53/04
[52] U.S. Cl. .................................. 55/179; 55/385.3; 55/387; 123/519
[58] Field of Search .................. 55/179, 180, 316, 350, 55/385.3, 387; 123/519, 520

[56] References Cited

U.S. PATENT DOCUMENTS

| | | | |
|---|---|---|---|
| 3,352,294 | 11/1967 | Biller et al. | 123/136 |
| 3,575,152 | 4/1971 | Wentworth | 123/136 |
| 3,884,204 | 5/1975 | Krautwurst et al. | 123/136 |
| 4,203,401 | 5/1980 | Kingsley et al. | 123/136 |
| 4,279,233 | 7/1981 | Tobita et al. | 123/519 |
| 4,280,466 | 7/1981 | Walters | 123/520 |
| 4,308,840 | 1/1982 | Hiramatsu et al. | 123/519 |
| 4,386,947 | 6/1983 | Mizuno et al. | 55/316 X |
| 4,430,099 | 2/1984 | Yanagisawa et al. | 55/316 |
| 4,448,594 | 5/1984 | Kozawa | 55/316 X |
| 4,496,379 | 1/1985 | Kozawa | 55/316 X |
| 4,778,495 | 10/1988 | Bishop et al. | 55/316 X |

FOREIGN PATENT DOCUMENTS 63-117155  5/1988  Japan ................... 123/519

*Primary Examiner*—Robert Spitzer
*Attorney, Agent, or Firm*—Patrick M. Griffin

[57] ABSTRACT

A canister is divided into small and large bed portions, with the small portion being loaded separately with just diurnal vapors so that it can be purged with a greater efficiency. At fuel fill, both bed portions are loaded simultaneously with a proportion of fuel fill vapors keyed to their own volume ratio, so that an effective capacity equal to the sum of the two is achieved.

2 Claims, 1 Drawing Sheet

HIGH EFFICIENCY VAPOR STORAGE CANISTER

This invention relates to vehicle fuel vapor storage canisters generally, and specifically to such a canister that can handle both diurnal and fuel fill vapors with increased efficiency.

BACKGROUND OF THE INVENTION

Vehicle vapor storage canisters must have a bed of adsorbent material of a volume sufficient to adsorb the greatest expected volume of fuel vapor emissions. Vehicle fuel tanks normally generate fuel vapors internally more or less continually when they are closed. This daily, per drive cycle volume of fuel vapors is generally referred to as the diurnal vapors or diurnal emissions, and are routed to the storage canister to avoid venting them to atmosphere. Purge air flow created b a source of purge vacuum, generally manifold vacuum, is then applied to the canister to pull outside air through the canister, drawing the stored vapors into the engine for combustion.

The efficiency of the purge operation may be quantified in terms of a dimensionless efficiency factor defined as the volume of purge air flow that is pulled through the adsorbent bed divided by the volume of the adsorbent bed. For a given volume of adsorbent, more purge air flow gives a more thorough purge. For a given purge air flow, a lesser volume of adsorbent is more thoroughly purged. The purge air flow available per drive cycle is limited, but the volume of diurnal vapors is generally small enough that the volume of the canister may in turn be small enough to give a high efficiency factor.

A new problem presents itself, however, when it is desired to also store and recover those fuel vapors that are displaced from the tank when it is filled, generally called the fuel fill vapors. Although these are generated less frequently, perhaps every ten drive cycles or so, they have a greater volume than the diurnal vapors, especially with large tanks that are mostly empty when filled. Consequently, the adsorbent bed volume must be greater. If that greater adsorbent volume were loaded with just the diurnal vapors, and then purged with the same, limited flow of purge air per drive cycle, the efficiency factor would consequently be lower. For example, all things being equal, the efficiency factor would be one third as great if the total adsorbent bed volume were tripled.

SUMMARY OF THE INVENTION

The invention provides a vapor storage canister that gives an increased efficiency for a given total volume of adsorbent.

Instead of a housing with a single adsorbent bed, the housing of the invention is partitioned lengthwise a relatively wider first bed portion and a relatively narrower second bed portion, which are physically separate. The second bed portion has just sufficient capacity to store the diurnal fuel vapors, but the first bed volume, though larger, does not by itself have sufficient capacity to store all of the fuel fill vapors. However, the two bed portions are used cooperatively in such a way as to handle both the diurnal and the fuel fill vapors, with increased efficiency.

A diurnal vapor inlet opens to the smaller, second bed portion only. The fill vapor inlet, on the other hand, has a chamber opening common to both the first and second bed portions. Through the use of properly sized openings in the chamber, it is possible to distribute the fuel fill vapors simultaneously to each of the bed portions in proportion to the ratio of its particular bed volume to the total volume. Thus, the diurnal vapors are loaded only to the smaller bed portion and, when purged with a given volume of available purge air flow, will be desorbed with a higher efficiency factor than they would be if stored in a larger volume adsorbent bed. The diurnal vapors would be stored and purged during each drive cycle. During fuel fill, which would occur less frequently, the fuel fill vapors would be stored simultaneously in both bed portions proportionally. And, through a suitable purge mechanism, both bed portions could then be purged simultaneously. Therefore, in terms of handling the fuel fill vapors, the effective capacity of a single canister with a total volume equal to the sum of the two bed portions is achieved.

In addition, in the preferred embodiment, an efficient scheme for using the available purge air flow is disclosed. A purge flow proportioning valve is adapted to divide the purge flow and deliver to each bed portion a percentage of purge flow that is a function of both its respective volume ratio of the bed and the frequency with which it is vapor loaded. Therefore, it is possible to purge each bed portion continually at substantially the same rate, with no need to switch purge air flow back and forth between bed portions.

It is, therefore, an object of the invention to provide a vapor storage canister capable of handling both diurnal vapors and fuel fill vapors with greater efficiency.

It is another object of the invention to provide a canister that has a smaller bed portion with just sufficient volume to store the diurnal vapors, and is therefore capable, with a given purge air flow, of purging the diurnal vapors with a greater efficiency, and which also has a larger bed portion in which fuel fill vapors can be stored simultaneously with the smaller bed portion, thereby giving an effective canister volume equal to the sum of the two.

It is another object of the invention to provide such a canister in which fuel fill vapors are directed proportionally to both bed portions simultaneously, allowing each to be loaded to substantially to the same degree.

It is yet another object to the invention to purge the canister with a purge proportioning valve that distributes purge flow to each bed portion dependent upon both its relative volume and upon the frequency of vapor loading, thereby allowing each bed portion to be purged on a continuing basis at substantially the same rate.

DESCRIPTION OF THE PREFERRED EMBODIMENT

These and other objects and features of the invention will appear from the following written description, and from the drawings, in which.

Figure 1:
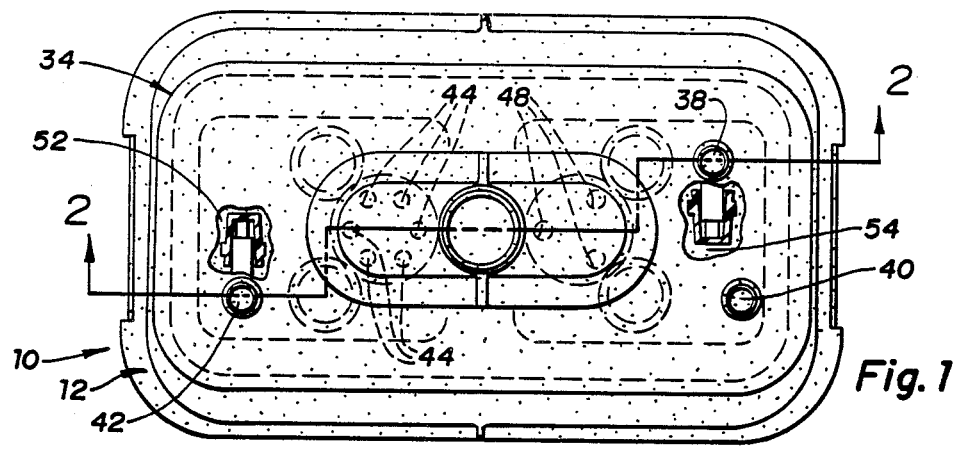
FIG. 1 is a top view of a preferred embodiment of the canister housing.
Figure 2:
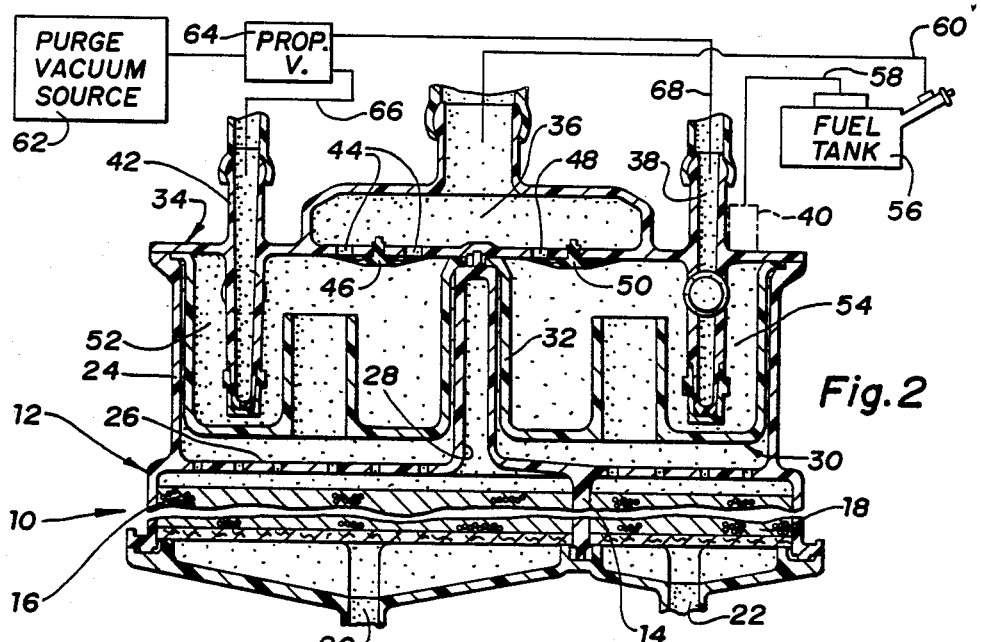
FIG. 2 is a sectional view of the top and bottom of the canister housing, showing a fuel tank, purge vacuum source, and purge proportioning valve schematically; and, FIG. 3 is a cross sectional view of just the top of the canister housing, showing fuel fill vapors loading both bed portions of the canister simultaneously.

Referring first to FIGS. 1 and 2, a preferred embodiment of the vapor storage canister of the invention, indicated generally at 10, includes a box shaped molded plastic housing, indicated generally at 12. Housing 12 is divided lengthwise by a partition 14 into a first adsorbent filled bed portion 16 and a separate, second adsorbent filled portion 18. Although they have the same length, the first bed portion 16 is significantly wider, and thus has a larger volume than 18, 1600 cc as compared to 400 cc. Separate outside air inlets 20 and 22 open through the bottom of the bed portions 16 and 18 respectively. At the top of housing 12, a perimeter wall 24 surrounds an apertured plate 26, which has an integrally molded hollow dividing wall 28 running down the middle. A molded plastic trap assembly, indicated generally at 30, has the basic shape of a double sink with a double fold center wall 32, and is sized to fit closely down inside of perimeter wall 24. The double fold wall 32 fits closely over the outside of dividing wall 28 with the bottom of trap assembly 30 spaced from apertured plate 26. A molded plastic cover assembly, indicated generally at 34, has a central inlet chamber 36, a first purge tube 38 and diurnal vapor inlet 40 on the right, and a second purge tube 42 on the left. There is no inlet for a carburetor bowl, as the embodiment disclosed would be used with a fuel injected vehicle. Inside inlet chamber 36, on the left, a set of six apertures 44 is covered on the underside by an umbrella valve 46. On the right, a set of three apertures 48 is covered on the underside by an umbrella valve 50. Canister housing 12 is completed by setting cover assembly 34 down on the edge of perimeter wall 24 and welding or gluing it along the perimeter as well as along its common junction with dividing wall 28 and double fold wall 32. This creates a liquid trap chamber 52 above the large bed portion 16 and a completely separate trap chamber 54 above small bed portion 18.

Figure 3:
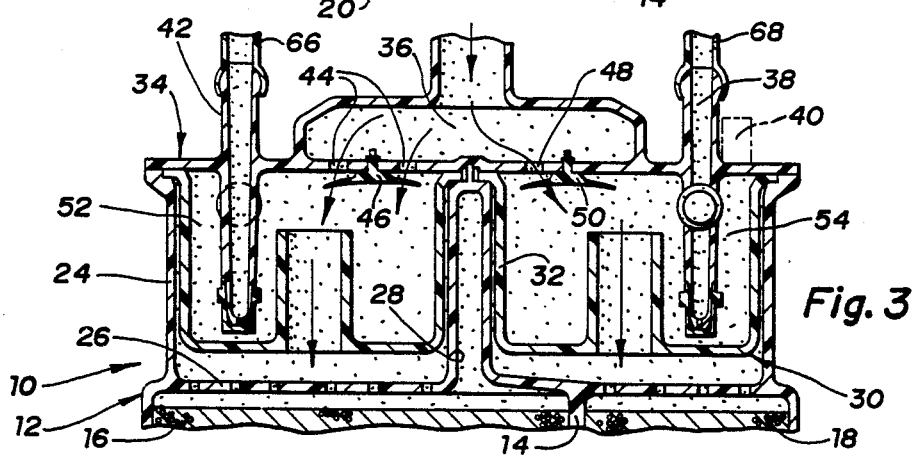

Referring next to FIGS. 2 and 3, canister 10 is used in a vehicle that has a conventional fuel tank 56, which, in the example disclosed, would have a volume of approximately thirteen gallons. A diurnal vent line 58 routes the diurnal vapors from the top of tank 56 to tank inlet 40, so that they enter trap chamber 54 and are adsorbed only in the small bed portion 18. Although the diurnal vapors are generated during every drive cycle, they are small enough in volume, and are purged frequently enough, that the small bed portion 18 would have adequate capacity. The fuel fill vapors would be generated much less frequently, perhaps every ten driving cycles, but would be much greater in volume. Instead of dumping them to atmosphere, a tank vapor vent line 60 routes the fuel fill vapors to canister central inlet chamber 36. The total area of both sets of apertures 44 and 48 would be made adequate to handle the total vapor flow through line 60 without a bottle neck, and their individual areas would be made proportional to the volume of their respective bed portions 16 and 18. Therefore, as illustrated in FIG. 3, the fuel fill vapors would simultaneously open both umbrella valves 46 and 50 and enter both trap chambers 52 and 54. The large and small bed portions 16 and 18 are thereby loaded together. By virtue of the proportioning effect of the two sets of apertures 44 and 48, each bed portion 16 and 18 would be loaded to approximately the same density or degree, equivalent to a single canister receiving the same vapor flow through a single inlet. Therefore, an effective capacity equal to the sum of the two bed portions 16 and 18 is achieved, although neither bed portion 16 or 18 alone would have the capacity to handle the fuel fill vapors.

While canister 10 alone provides an advantage in terms of volume and size, it must still be purged after vapor loading. In FIG. 2, a typical source of purge vacuum is indicated schematically at 62, which would usually consist of manifold vacuum or the like. When applied to either purge tube 38 or 42 during a drive cycle, it would draw outside air in through the air inlets 22 or 20, respectively, and then through the bed portions 18 or 16, respectively, to desorb the stored vapors and carry them to the manifold for combustion. A purge mechanism could be provided in which, through a combination of suitable sensors and solenoid operated switching valves, the entire purge flow would be directed just through the small bed portion 18, except after the fill operation, when it would be directed through just the large bed portion 16 for a sufficient purge period. Of course, the small bed portion 18 would go largely unpurged for that selected period. However, the small bed portion 18, when it was being purged, would be much more efficiently purged by any given volume of purge flow than would a larger volume bed loaded with the same volume of vapor, as will be shown in detail below.

Still referring to FIG. 2, a specific purge mechanism and scheme is disclosed that is well suited to the canister 10, and which would purge both bed portions 16 and 18 very efficiently. A purge flow proportioning valve, indicated generally at 64, is adapted to divide the purge flow from source 62 between a purge line 68 to the small bed portion purge tube 38, and a purge line 66 to the large bed portion purge tube 42. Proportioning valve 64 would continually send to each bed portion 16 and 18 that percentage of the total purge flow that would keep each bed portion 16 and 18 purged to substantially the same degree, or at the same rate. This could be done with properly sized orifices or the like, similarly to the way in which the two sets of apertures 44 and 48 operate. However, account would also have to be taken not just of the relative volumes of the large and small bed portions 16 and 18, but also of the differing frequencies with which they are vapor loaded, as is described next.

In general, the goal would be to have the large bed portion 16 purged with the same efficiency factor, as defined above, as the small bed 18. This would allow each bed portion 16 and 18 to stay even with the other, in effect. Specifically, arbitrarily call "X" the percentage of purge flow through the large bed 16, and "PT" the total purge flow during a drive cycle, and solve for the case where the large bed 16 receives equal purge over ten cycles to what the small bed 18 receives over one cycle. Mathematically, $[(X)(PT)(10)]/1600$ cc $= [(1-X)(PT)(1)]/400$ cc. Solving, one obtains $X=0.29$, so 29 percent would be made to flow through the large bed 16, and the remaining 71 per cent through the small bed 18. Even though less than the total available purge air flow is directed through the small bed 18 during each drive cycle, it would still be purged with a greater efficiency factor than would be an equivalent single bed with a volume equal to the sum of both bed portions 16 and 18. For ease of calculation, assume PT equal to 100 liters of purge air per drive cycle. If the small bed 18 were to receive 71 percent of that through its 0.4 liter volume, an efficiency factor of approximately 178 results. For comparison, a single bed with a total volume of 2 liters, even receiving all 100 liters of purge air flow, would have an efficiency factor of only 50. Those skilled in the art will recognize that a higher efficiency factor translates into more efficient operation of the adsorbent in terms of grams of vapor lost per gram adsorbed. In short, the canister and purge scheme both provide increased efficiency of operation, for a given total canister volume and given total purge air flow, with no loss in effective total capacity.

Variations of the preferred embodiment maybe made. As already noted, a different purge mechanism could be provided. The particular embodiment of housing 12 provides many advantages in terms of manufacture and assembly, while meeting the goals of having physically separate bed portions with a common fill vapor inlet. The hollow dividing wall 28 provides a locator and support for the trap assembly 30. When nested together, the hollow dividing wall 28 and the double fold wall 32 of he trap assembly 30 provide a common junction to which the cover assembly 34 may be glued or welded. If the adsorbent material and canister housing bottom are added last, the hollow nature of the dividing wall 28 provides convenient access to that common juncture for sonic welding. The partition 14, not being in the middle of housing 12, leaves the hollow dividing wall 28 unobstructed for such an operation. Once the common juncture has been seamed or welded, the continuous, integrally molded nature of the walls 28 and 32 maintains the physical separateness of the bed portions 16 and 18. In general, however, any canister housing that provided the two separate bed portions and the common, proportioning fuel fill vapor inlet would work. Therefore, it will be understood that it is not intended to limit the invention to the particular embodiment disclosed.

The embodiments of the invention in which an exclusive property or privilege is claimed are defined as follows:

1. For use in a vehicle having a fuel tank from which a relatively smaller volume of diurnal fuel vapors is continually generated, and from which a relatively larger volume of fuel fill vapors is displaced less frequently during the fill operation, and also having a source of purge air, a vapor storage canister providing improved efficiency in the storage and purging of both said diurnal and said fuel fill vapors, said canister comprising, a generally elongated, adsorbent filled housing having a total volume partitioned into a pair of separate bed portions, including a relatively larger first bed portion, and a relatively smaller second bed portion having just sufficient capacity to store said diurnal fuel vapors, a diurnal vapor inlet opening only to said second bed portion, a fill vapor inlet opening to both said first and second bed portions and adapted to distribute said fuel fill vapors simultaneously to each of said first and second bed portions in proportion to the ratio of its particular volume to the total volume, and, purge means allowing purge air to be selectively applied to said bed portions, whereby, said second bed portion may be loaded separately by said diurnal vapors only and later purged more thoroughly by a given volume of purge air than would an adsorbent bed of greater volume purged by the same volume of purge air, and during fuel fill, both bed portions may be loaded simultaneously and substantially at the same rate by said fuel fill vapors and then purged later, thereby giving an effective capacity substantially equal to a single bed with a volume equal to both of said bed portions.

2. For use in a vehicle having a fuel tank from which a relatively smaller volume of diurnal fuel vapors is continually generated during each drive cycle, and from which a relatively larger volume of fuel fill vapors is displaced less frequently during the fill operation, and also having a limited purge air flow available per drive cycle, a vapor storage canister providing improved efficiency in the storage and purging of both said diurnal and said fuel fill vapors, said canister comprising, a generally elongated, adsorbent filled housing having a total volume partitioned lengthwise into a pair of separate bed portions, including a relatively wider first bed portion and a relatively narrower second bed portion having just sufficient capacity to store said diurnal fuel vapors, a diurnal vapor inlet opening only to said second bed portion, a fill vapor inlet opening to both said first and second bed portions and adapted to distribute said fuel fill vapors simultaneously to each of said first and second bed portions in proportion to the ratio of its particular bed volume to the total volume, and, a purge flow proportioning valve adapted to continually distribute to each of said bed portions a percentage of said limited purge air flow that is a function of its particular bed volume ratio and of the frequency of vapor loading so as to continually purge each of said bed portions at substantially the same rate, whereby, said second bed portion may be loaded separately by said diurnal vapors only and purged during each drive cycle by its respective portion of purge air flow more thoroughly than would an adsorbent bed of greater volume purged by the same purge air flow, and, during fuel fill, each of said bed portions may be loaded simultaneously and substantially at the same rate by said fuel fill vapors and then later simultaneously purged during each drive cycle by its respective percentage of purge air flow, thereby giving an effective capacity substantially equal to a single bed with a volume equal to both of said bed portions.

* * * * *